US008668452B2

(12) United States Patent
Henriksen

(10) Patent No.: US 8,668,452 B2
(45) Date of Patent: Mar. 11, 2014

(54) FLOATING DEVICE FOR PRODUCTION OF ENERGY FROM WATER CURRENTS

(75) Inventor: Svein Dag Henriksen, Harstad (NO)

(73) Assignee: Hydra Tidal Energy Technology AS, Harstad (NO)

( * ) Notice: Subject to any disclaimer, the term of this patent is extended or adjusted under 35 U.S.C. 154(b) by 751 days.

(21) Appl. No.: 12/526,975

(22) PCT Filed: Feb. 14, 2008

(86) PCT No.: PCT/NO2008/000059
§ 371 (c)(1),
(2), (4) Date: Nov. 6, 2009

(87) PCT Pub. No.: WO2008/100157
PCT Pub. Date: Aug. 21, 2008

(65) Prior Publication Data
US 2010/0074750 A1    Mar. 25, 2010

(30) Foreign Application Priority Data
Feb. 16, 2007    (NO) .................................. 2007 0911

(51) Int. Cl.
*F03B 13/10*    (2006.01)
(52) U.S. Cl.
USPC ................................. 416/85; 415/7
(58) Field of Classification Search
USPC .......................................... 415/7; 416/85, 86
See application file for complete search history.

(56) References Cited

U.S. PATENT DOCUMENTS

| 3,151,594 | A |   | 7/1962  | Collipp |
|---|---|---|---|---|
| 3,063,397 | A | * | 11/1962 | Boericke, Jr. ................... 114/57 |
| 3,726,247 | A |   | 4/1973  | Dalzell |
| 4,383,182 | A |   | 5/1983  | Bowley |
| 4,406,586 | A | * | 9/1983  | de la Roche Kerandraon et al. ............................. 416/85 |
| 4,509,448 | A |   | 4/1985  | Pease et al. |
| 6,652,221 | B1 |  | 11/2003 | Praenkel |

(Continued)

FOREIGN PATENT DOCUMENTS

| EP | 0074938 A2 | 3/1983 |
|---|---|---|
| EP | 0950812 B1 | 10/1999 |

(Continued)

OTHER PUBLICATIONS

Parallel Chinese application Office Action dated Dec. 29, 2010.

(Continued)

*Primary Examiner* — Edward Look
*Assistant Examiner* — Liam McDowell
(74) *Attorney, Agent, or Firm* — Harness, Dickey & Pierce, PLC

(57) ABSTRACT

The invention relates to an device for production of energy from currents in water, comprising a first element (10), a second element (20) and a plurality of turbine modules (750) connected to the first element. The second element is mounted on the first element in an approximately perpendicular relationship, the first element is adapted for submersion below a water surface, and an upper part of the second element projects up above the water surface when the plant is in production. The invention also relates to an anchoring device for a floating plant (10, 20), comprising mooring lines (24a, 24b) which are connected at one of their respective ends to the plant and which are connected at their respective second ends to buoys (50, 52), where the mooring lines (24a, 24b) extend substantially horizontally between the plant and the respective buoys.

8 Claims, 6 Drawing Sheets

(56) References Cited

U.S. PATENT DOCUMENTS

| | | | |
|---|---|---|---|
| 7,307,356 B2 * | 12/2007 | Fraenkel | 290/54 |
| 7,352,074 B1 * | 4/2008 | Pas | 290/43 |
| 2002/0158472 A1 | 10/2002 | Robson | |
| 2008/0018115 A1 * | 1/2008 | Orlov | 290/54 |

FOREIGN PATENT DOCUMENTS

| | | |
|---|---|---|
| GB | 2348249 A | 9/2000 |
| GB | 2378679 A | 2/2003 |
| GB | 2422878 A | 8/2006 |
| JP | 53122039 A | 10/1978 |
| JP | 55001445 A | 1/1980 |
| NL | 1027287 C | 4/2006 |
| WO | WO-8100595 A1 | 3/1981 |
| WO | 0042318 A1 | 7/2000 |
| WO | WO-0134973 A1 | 5/2001 |
| WO | 03004869 A1 | 1/2003 |
| WO | WO-2004104411 A1 | 12/2004 |
| WO | 2005061886 A1 | 7/2005 |
| WO | 2005061887 A1 | 7/2005 |
| WO | 2006054084 A1 | 5/2006 |
| WO | 2006061652 A1 | 6/2006 |

OTHER PUBLICATIONS

Japanese Office Action dated Sep. 12, 2012 (Eng. translation).
Australian Office Action; Examiner's First Report on Patent Application No. 2008215210 by Hydra Tidal Energy Technology AS.
Extended European Search Report dated Mar. 13, 2013, 5 pages.

* cited by examiner

FLOATING DEVICE FOR PRODUCTION OF ENERGY FROM WATER CURRENTS

FIELD

The invention relates to a device for production of energy from currents in water. The plant utilises currents below the surface of oceans, lakes, rivers and other bodies of water. Such currents may, e.g., be created by ocean currents, tidal variations and/or underwater topography (e.g. straits, riverbeds or other narrow passages under water).

BACKGROUND

There are a number of known devices and methods for production of energy from ocean currents.

Norwegian patent application no. 1999 1984 describes a plant for production of electrical energy from ocean and river currents. The plant is in its entirety located below the surface of the water and comprises several turbines with blades, a support system, a guy system and a generator. The turbines' shafts are oriented normal to the water's direction of motion and the blades are wing-shaped so that the turbine rotates in the same direction, irrespective of the water's direction of motion. The turbine shafts are supported in a framework with buoyancy tanks, mounted on the support and bearing system, and the plant is composed of modules. The plant has positive buoyancy regulated by the buoyancy tanks and a guy system secured below the surface of the water, with the result that the plant is held under the surface by the guy system. The plant employs traditional blades.

U.S. Pat. No. 4,864,152 describes a floating water current power plant consisting of a ring pontoon which by means of a bollard is moored to anchors on the bottom. All the turbines can be replaced and are mounted on a common beam and can be pivoted up to the surface as one unit within the area defined by the ring pontoon. The power plant can move around the bollard, whose top end is connected to a fore pontoon and whose bottom end is secured to the anchors.

U.S. Pat. No. 5,440,176 describes a submersible water turbine plant comprising turbines/generators in different combinations suspended beneath a submerged platform of the tension leg type.

Another example of a floating tidal power plant is mentioned in the applicant's own international patent application PCT/NO02/00249 (International publication no. WO03/006825 A1). This plant comprises a platform with a number of buoyancy elements, preferably one in each corner of the platform, thereby satisfying the requirement for stability both in the lateral and the longitudinal direction, with the minimum of displacement. A number of supporting arms extend from the platform to each side, each holding a generator housing. The supporting arms are hinged at the attachment point in the platform.

The known plants are substantially designed with a view to being placed in coastal waters, where wind and wave forces are more moderate than they can be on the open sea. However, there exists a substantial energy recovery potential in placing power plants at sea or in other demanding environments. There is therefore a need for a plant for production of energy from currents in water which can withstand greater environmental forces than hitherto known plants. Norwegian patent application no. 20070228 describes a plant for production of energy from currents in water, comprising a structure for submerging in the water and a plurality of turbine modules connected to the structure. The plant comprises a plurality of columns which are connected to the structure at one of their respective ends and furthermore slidably connected to a buoyancy element, and each column can be selectively and releasably attached to the buoyancy element.

Plants located at sea, however, are exposed to substantial dynamic loads induced by waves and wind. In the above-mentioned plant for location at sea, the part of the buoyancy element located above the surface of the water may be subjected to wave and wind loads which can cause the whole plant to be set in relatively substantial motion, particularly about the plant's transversal axis. This represents structural challenges as well as having an unfavourable effect on the turbines' efficiency. There is therefore a need for a plant which is less sensitive to substantial environmental forces.

SUMMARY

According to the invention, therefore, a device is provided for production of energy from currents in water, comprising a first element, a second element and a plurality of turbine modules connected to the first element, characterised in that the second element is mounted on the first element in an approximately perpendicular relationship, that the first element is adapted for submersion beneath a water surface, and that an upper part of the second element projects up above the water surface when the plant is in production.

The first element is preferably equipped with ballast tanks and a keel. It may also advantageously be equipped with stabilisers, preferably at the two ends of the first element.

According to the invention a mooring device is also provided for a floating plant, comprising mooring lines which are connected at one of their respective ends to the plant, characterised in that the mooring lines are connected at their respective second ends to buoys via respective attachment points and lines below a water surface, whereby the mooring lines extend substantially horizontally between the plant and the respective buoys.

The buoys are advantageously connected to respective anchors on the bottom below the water surface via mooring lines (26a, 26b, 26c).

DRAWINGS

Embodiments of the invention will become apparent from the attached patent claims, as well as from the following description with reference to the attached drawings. It should be understood that the drawings only illustrate typical embodiments, and should not be considered to be limiting for the invention. In the drawings like parts are indicated by like reference numerals, which will also be employed in the following.

DETAILED DESCRIPTION

Figure 1:
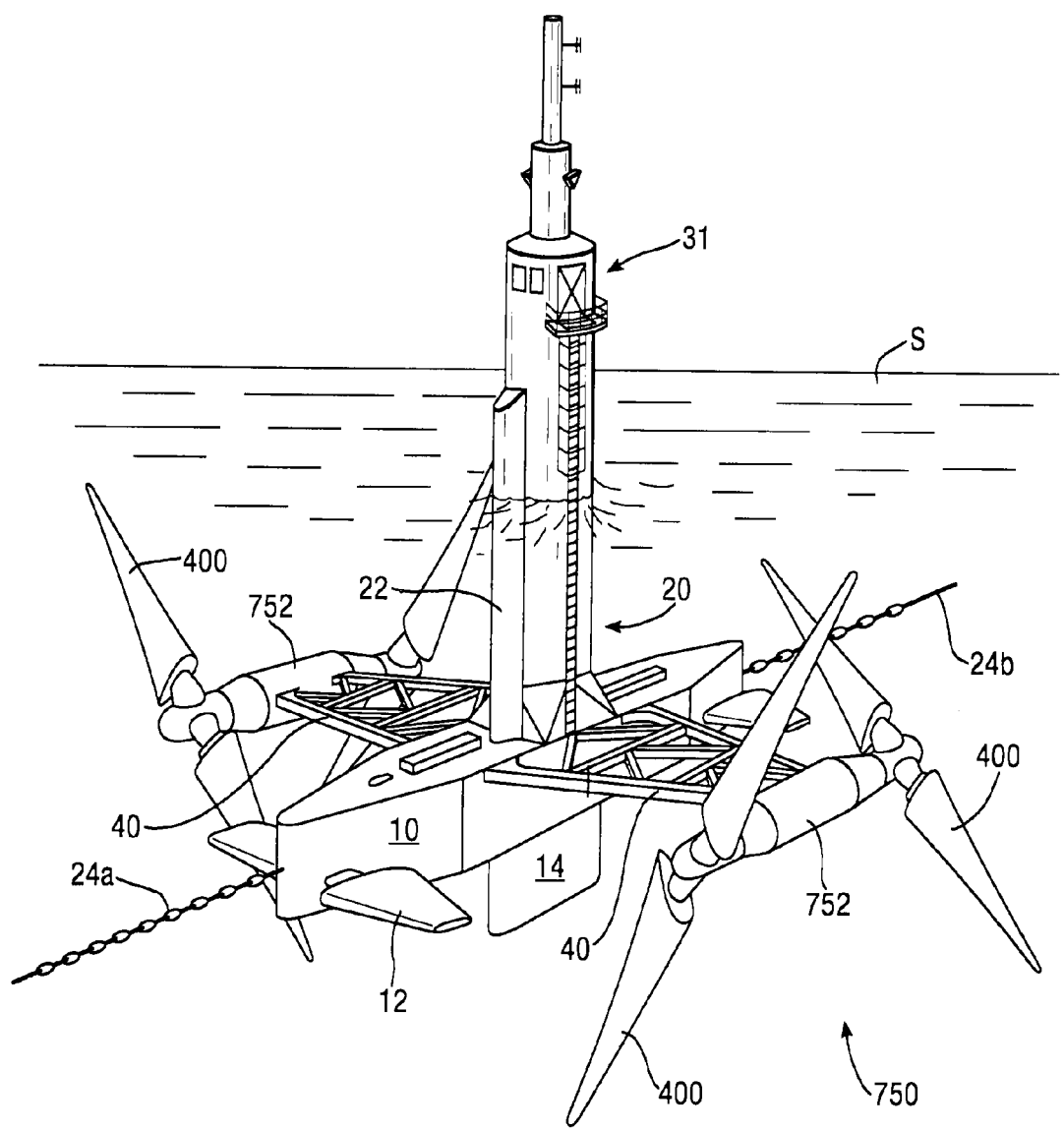
FIG. 1 is a perspective view of an embodiment of the plant according to the invention.

The plant according to the invention is adapted for partial submersion in water below a surface S. The plant comprises a first body 10 which is preferably an underwater structure and a second body 20 which is preferably an upwardly-projecting structure as illustrated in FIG. 1, where it can be seen that a part of the second body 20 projects up above the water surface S when the plant is located in an operating position in the water. FIG. 1 illustrates an embodiment where the structures 10, 20 are hull-shaped bodies.

The second body 20, which will hereinafter be referred to as a tower 20 may also comprise control room 31 and other equipment and facilities for operation of the plant, including ballast tanks (not shown) and access channels (not shown) to the underwater structure 10.

Projecting supporting arms 40 are mounted to the structure 10. As illustrated in the figures, the supporting arms are preferably mounted to respective opposite sides of the structure 10. In the figures the supporting arms 40 are depicted as truss structures, but a person skilled in the art will appreciate that other constructions are possible. At the outer ends of each of the respective supporting arms 40 respective turbine modules 750 are provided.

In this context "turbine module" should be understood to refer to a module comprising one or more turbines 400, a machinery housing 752 possibly with shafts for connection to the turbines, hub, pitch control system etc., together with other contents required to enable energy to be produced from water currents.

A turbine 400 may comprise one, two, three or more individual turbine blades, as a skilled person will understand. In the following, "turbine" will be used as a common designation, irrespective of the number of turbine blades.

Figure 3:
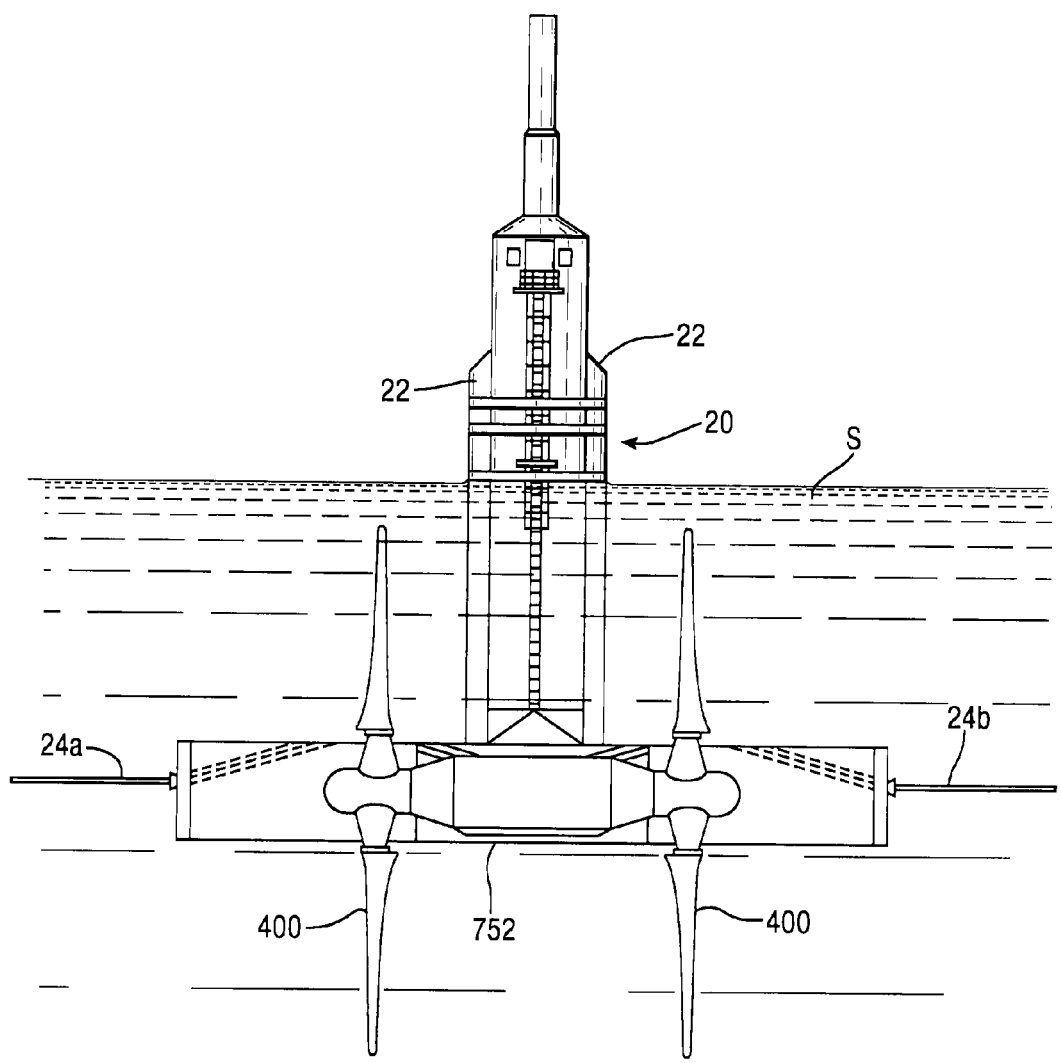
FIG. 3 is a side view of the plant illustrated in FIG. 2.
Figure 4:
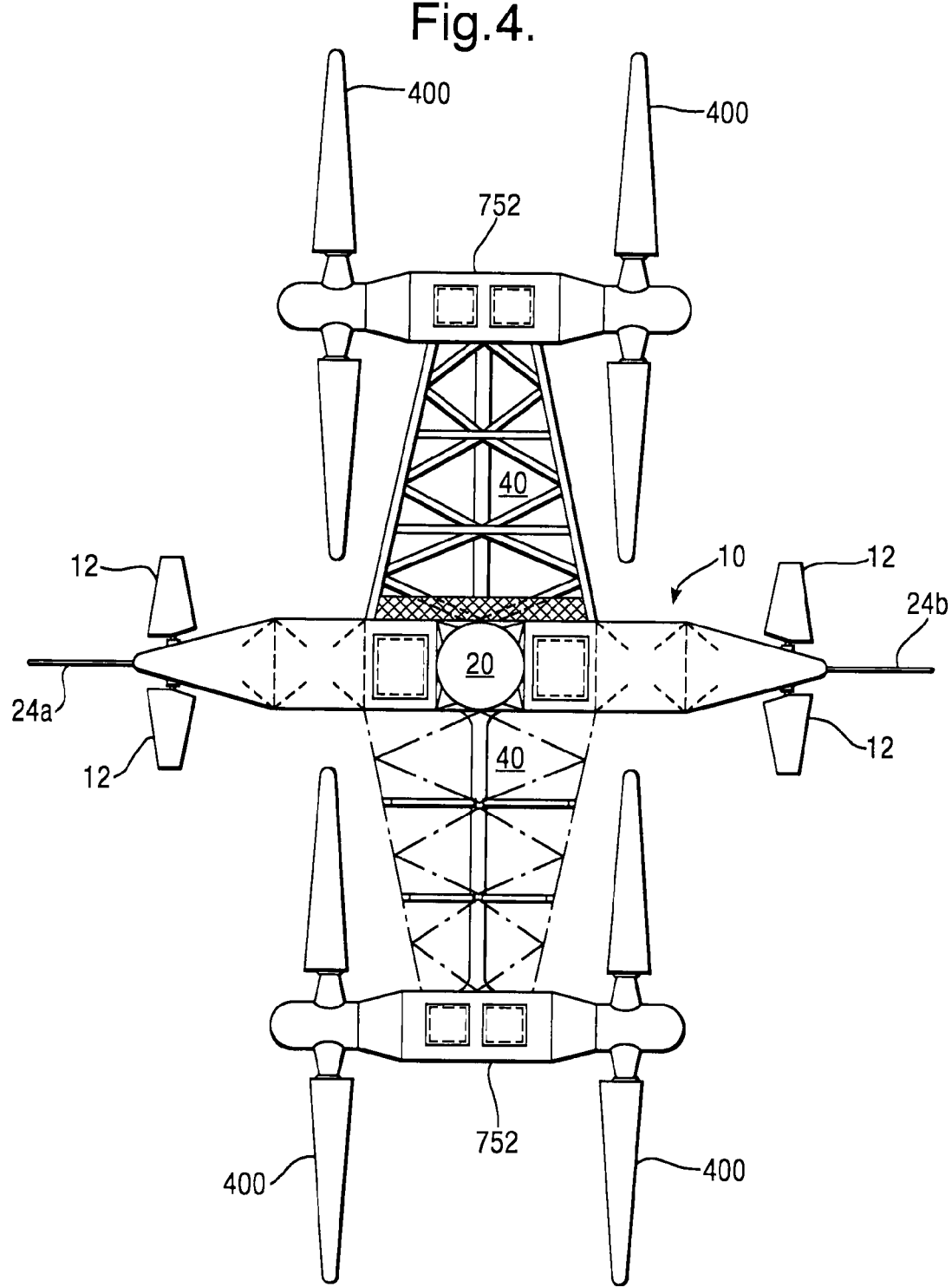
FIG. 4 is a principle view of an embodiment of the plant according to the invention, viewed from above.

FIGS. 1, 3 and 4 show turbine modules 750 with two turbines 400, preferably arranged one at each end of each machinery housing 752. In this configuration the two turbines may be arranged so as to be counter-rotating.

Depending on the generator solution selected, the machinery housings 752 may contain amongst other things hydraulic turbines (pumps) which via lines operate respective hydraulic electric generators. The electric generators may, for example, be located in the tower 20 or in the underwater structure 10. In another variant the machinery housings 752 may contain conventional generators which produce electrical power by rotation, in a manner which will be known to a person skilled in the art. In yet another variant the machinery housings 752 may contain counter-rotating generators, e.g. as described in Norwegian patent application 2002 0800.

The tower 20 is illustrated as a substantially tubular element with tapering portions 22, oppositely directed along the plant's longitudinal axis. Other tower cross sectional shapes (e.g. ellipse, rectangle) and configurations (e.g. trusswork), however, should be considered to be covered by the present invention, if they carry out a similar function. The tapering portions 22 have a resistance-reducing effect when the plant is exposed to water currents, in addition to which they will help to repel objects drifting against the plant.

Figure 2:
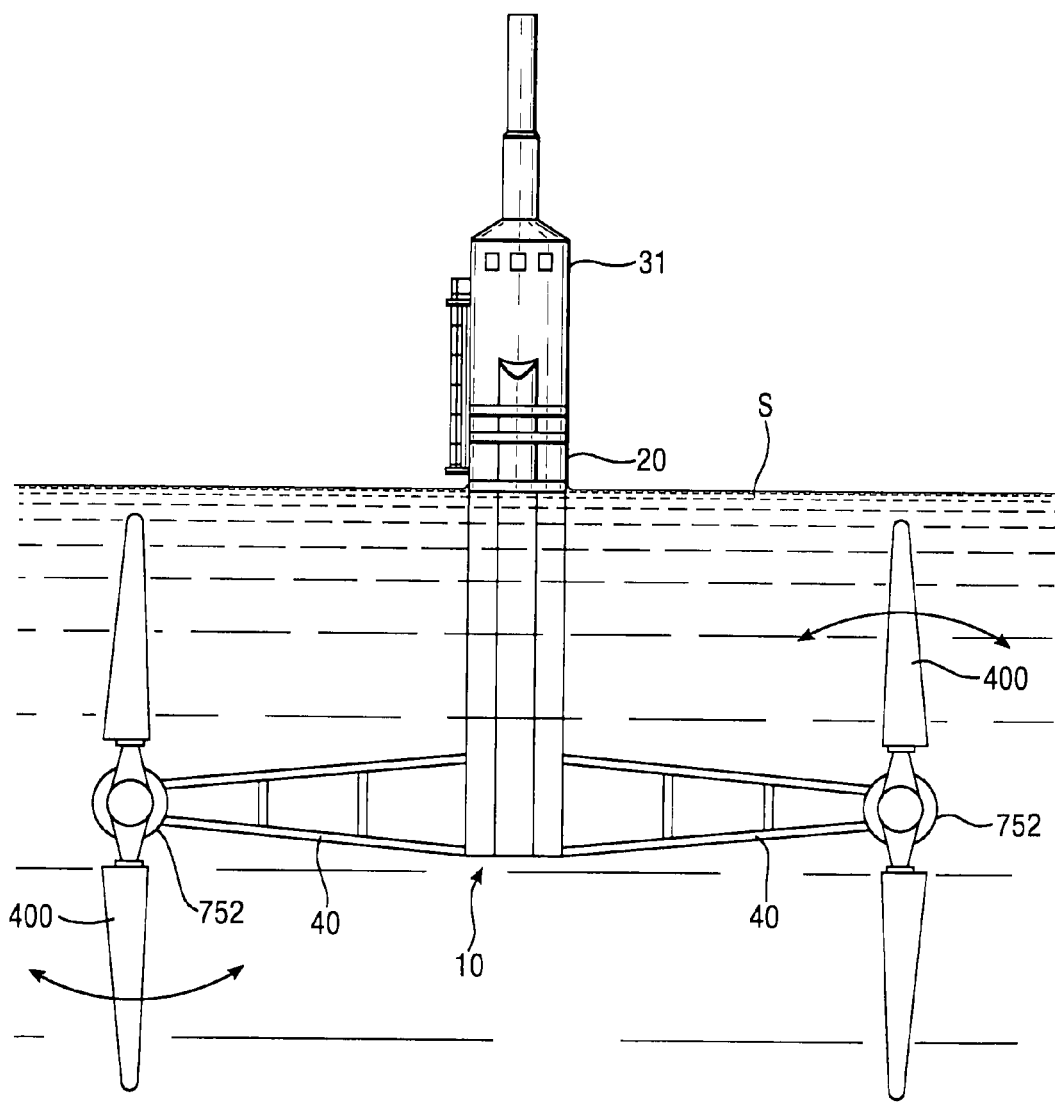
FIG. 2 is an end view of an embodiment of the plant according to the invention.

FIG. 1 illustrates an embodiment of the invention where the underwater structure 10 is provided with a keel 14. The keel 14 may advantageously be equipped with an extra weight. The underwater structure 10 may also be equipped with stabilisers 12, arranged in pairs at respective ends of the structure 10, as illustrated in FIGS. 1 and 4. The stabilisers 12 may be fixed or rotatably mounted to the structure 10. Neither the keel 14 nor the stabilisers are shown in FIGS. 2 and 3.

When the plant is in the water it may be anchored to e.g. the seabed via anchor chains (or lines, cables or ropes, etc.; hereinafter: mooring lines) which are attached to the plant in a known per se manner. In the figures, mooring lines 24a, 24b are attached to respective ends of the underwater structure 10.

FIGS. 1, 3 and 4 illustrate parts of the mooring lines 24a, 24b. Further details regarding maneuvering and locking of the mooring lines to the plant have been omitted for the sake of illustrative clarity, and because these details are known in the prior art. In the same way, the attachment of cables for export of electrical power and control of the plant has been omitted, since these tasks are conducted in a manner well known to a person skilled in the art.

Both the underwater structure 10 and the tower 20 preferably contain ballast tanks (not shown), thus enabling raising, lowering and positioning of the plant to be controlled by means of ballasting and de-ballasting of these tanks.

As the figures show, the supporting arms 40 are preferably mounted approximately perpendicularly relative to the underwater structure 10. Even though this is a preferred arrangement, however, the invention should not be limited to a strictly perpendicular relationship between supporting arms and underwater structure. The skilled person will appreciate that the supporting arms may also be mounted in a moderate dihedral configuration; this may reduce the need to tilt the plant during service, when the underwater structure 10 is raised up to or above the water's surface S. However, this will require greater strength in the supporting arms and extra buoyancy capacity in the plant in order to lift the turbine modules up above the water surface S.

Figure 5:
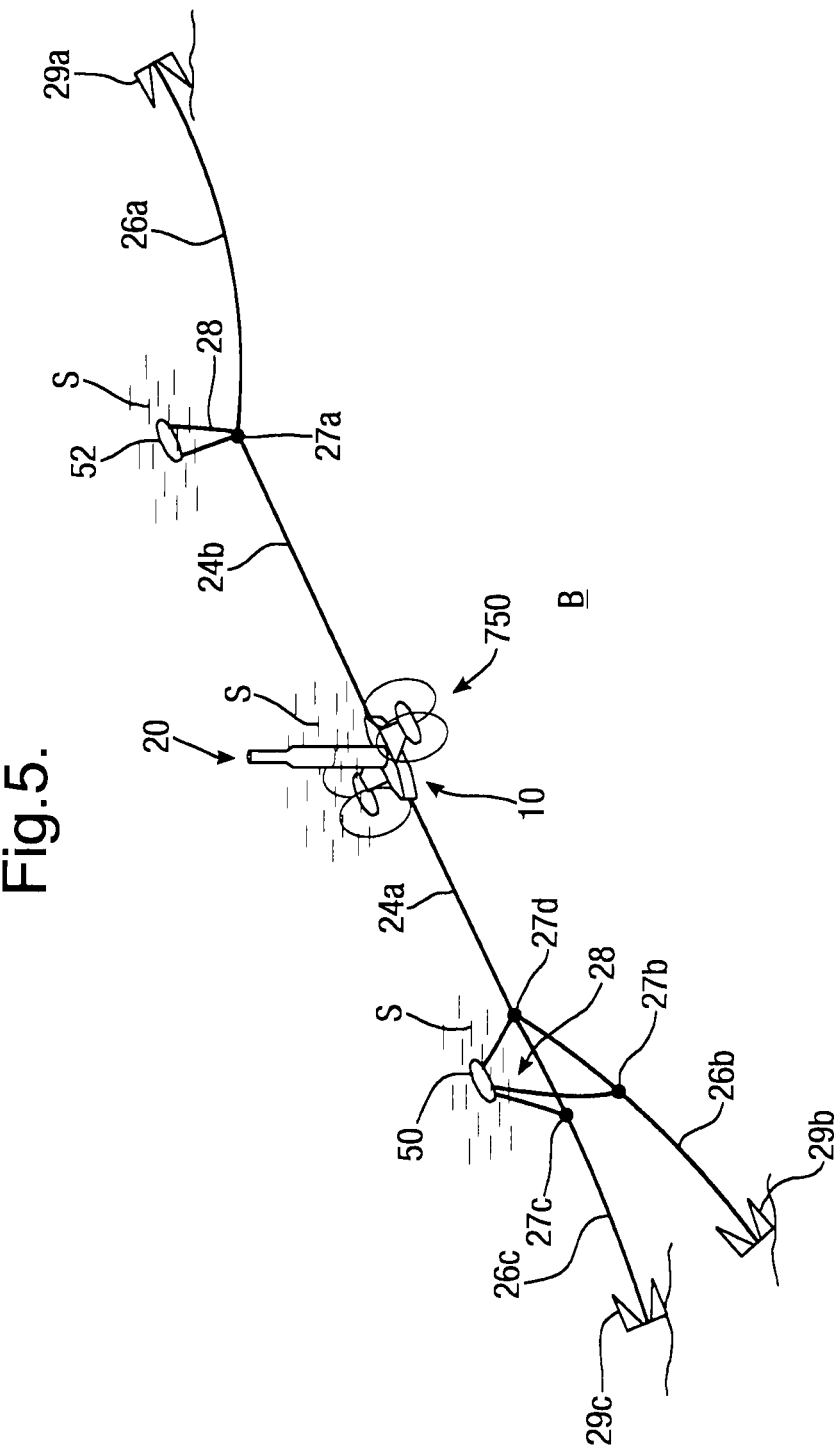
FIG. 5 is a principle view of the mooring system according to the invention.

Reference is now made to FIG. 5, which illustrates a new anchoring system for the plant when it is located in the water. The plant 10, 20 is shown in an operating condition, where the underwater structure 10 is submerged and the tower 20 projects partly up above the water surface S.

The mooring lines 24a, 24b are connected at their first ends to respective ends of the underwater structure 10, as mentioned above. The mooring lines' 24a, 24b respective second ends are connected to separate buoys 50, 52, both of which are shown floating in the water surface S. The buoys are anchored to the seabed B by means of lower mooring lines 26a, b, c connected to respective anchors 29a, b, c. As FIG. 5 illustrates, the mooring lines 24a, 24b may advantageously be connected to the buoys 50, 51 via suitable connecting points 27a, 27b, 27c, 27d and lines 28 of a suitable length. In this manner the mooring lines' 24a, 24b respective second ends are connected to the connecting points 27a, 27b, 27c, 27d at a level below the water surface S substantially corresponding to the level below the water surface S where the mooring lines' 24a, 24b first ends are connected to the underwater structure 10.

An anchoring system of this kind ensures that the mooring lines 24a, 24b extend in as horizontal a manner as possible in the water. The plant 10, 20 is thereby exposed to substantially horizontal tension loads and the plant remains lying in as horizontal a position as possible in the water. The vertical force component normally experienced when using conventional anchoring is thereby avoided. Combined with the appropriate shape of the tower 10, this anchoring system helps to reduce the pitching of the plant in the water, even in rough seas.

A key aspect of the proposed buoy anchoring system is that the anchor line holding the plant in position when it is in operation (for example production load/drag approximately 160 to 180 tons static+additional dynamic load) does not give a substantial vertical load component to the plant 10, 20. For example, a tension in the mooring line 24a, 24b of approximately 200 tons, with an angle between the lower mooring line 26a or 26b, c and the seabed of approximately 20 degrees and a total mooring line length of approximately 150 meters will give a requirement for approximately 70 tons of buoyancy in the buoy. For example, the buoy 50, 52 may be designed to have a buoyancy of 70 tons when it penetrates the water surface S. Furthermore, it is essential to note that the buoy has approximately the same buoyancy all the time, even though, for example, it sinks 3 meters below the water surface S. If this should happen, however, for example when forces increase above the assumed maximum, the angle between the mooring line into the plant and down to the bottom B will be simultaneously reduced, perhaps to approximately 16 degrees. The need for buoyancy in the buoy will thereby also be reduced to approximately 60 tons. The angle into the plant will be altered by only about 1.25 degrees providing there is a distance of approximately 100 meters between plant and buoy. Thus the system is unique since the buoyancy requirement in the buoy is reduced as the angle decreases.

Figure 6:
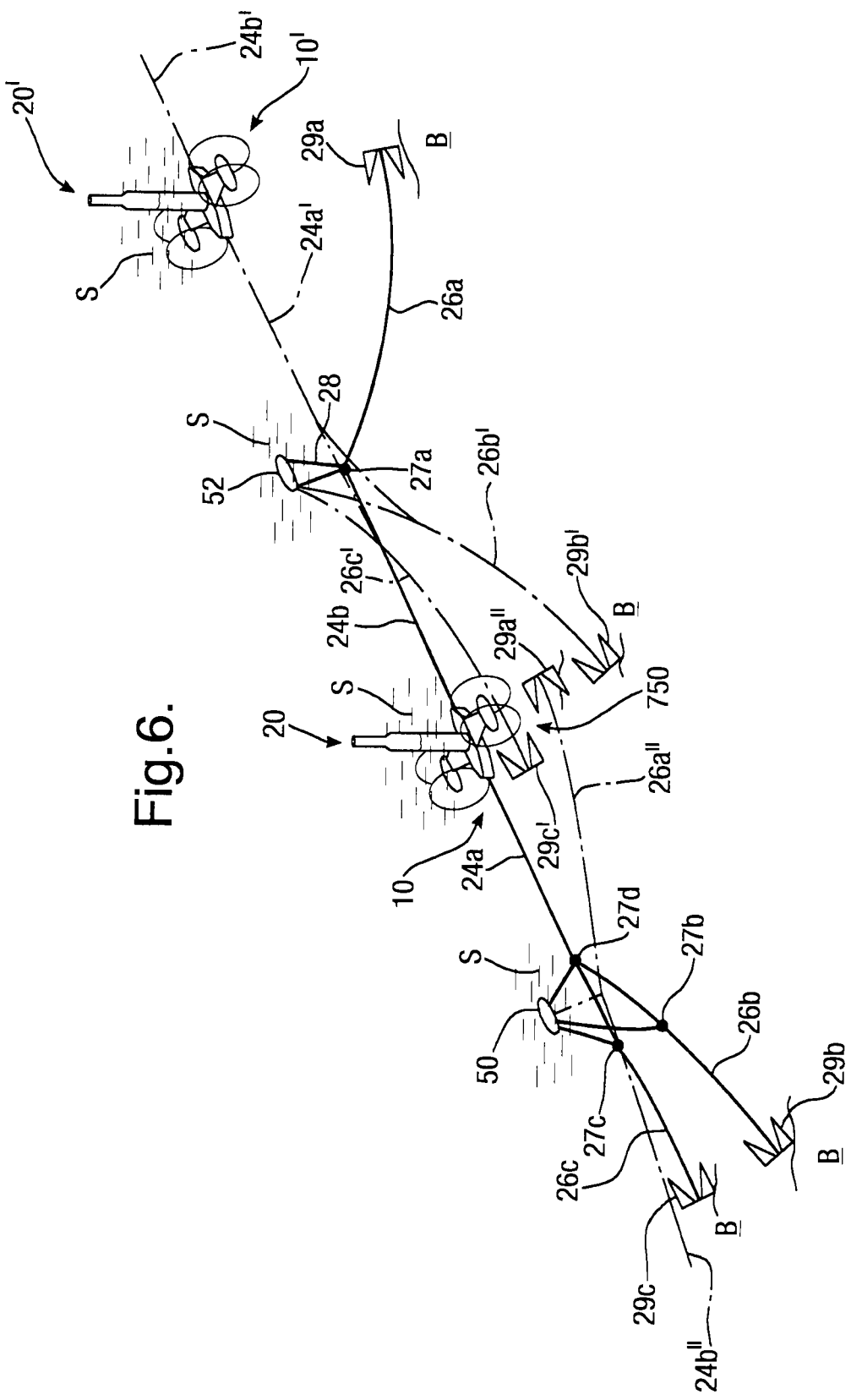
FIG. 6 is a principle view of the mooring system corresponding to that illustrated in FIG. 5, where several plants are connected together in series.

FIG. 6 illustrates a series device as in FIG. 5, connected together in a row. Plant 10', 20' is installed in series upstream or downstream of the plant 10, 20 described above. The plant 10', 20' is connected via the mooring line 24a' to the lower mooring line 26b' and the anchor 29b' via the connecting point 27a to the buoy 52. On the plant's 10, 20 left side, a mooring line 24b" indicates that a corresponding plant is mounted on the plant's 10, 20 left side. In this way several plants can be connected in series, with a minimum of one buoy on each side of each plant and a minimum of one anchor in each direction. Alternatively, several anchors may be employed in each direction out from the buoy. This will give less lateral drift.

Alternatively, several power plants in a row may combine the use of only one buoy between the power plants, since there is only tension in the direction of flow, which reverses approximately every six hours. In order to avoid moorings rubbing against one another in such an device, it may be ideal to use only one anchor in one direction and possibly two in the other direction. See perspective view.

As mooring lines, use may be made of combinations of chain, steel wire and artificial fibre rope.

The invention claimed is:

1. A floating device for production of electrical energy from currents in a body of water with a water surface, comprising a first element, a tower and a plurality of turbine modules connected to the first element, wherein the first element and the turbine modules are adapted for submersion under the water surface, and that the tower is mounted on the first element and extends upwards from the first element when the first element is in a submerged condition, and an upper part of the tower projects up above the water surface when the floating device is in operation, wherein the floating device comprises supporting arms which are mounted to the first element, the supporting arms having outer ends, the turbine modules comprising respective machinery housings which are mounted to said outer ends of the supporting arms such that the machinery housings are at substantially a same vertical depth as the first element when the floating device is in the submerged condition.

2. The floating device according to claim 1, wherein the first element is provided with a keel.

3. The floating device according to claim 1 wherein the first element is provided with stabilizers.

4. The floating device according to claim 1, wherein stabilizers are connected to the first element along respective ends thereof.

5. The floating device according to claim 1, wherein the floating device comprises two said supporting arms which are mounted to respective opposite sides of the first element.

6. The floating device according to claim 1, wherein the supporting arms are mounted to the first element such that the supporting arms are parallel to the water surface in still water.

7. The floating device according to claim 1, wherein the floating structure comprises mooring lines which are attached to respective ends of the first element.

8. The floating device according to claim 1, wherein the supporting arms are immovably mounted to the first element.

\* \* \* \* \*